May 24, 1932.　　　J. L. WILSON　　　1,859,546

MEANS FOR INDICATING METACENTRIC HEIGHT

Original Filed Dec. 16, 1929

INVENTOR
John Lyell Wilson
BY
E. C. Sanborn
ATTORNEY

Patented May 24, 1932

1,859,546

UNITED STATES PATENT OFFICE

JOHN LYELL WILSON, OF BROOKLYN, NEW YORK, ASSIGNOR TO STABILITY METER CORPORATION, OF NEW YORK, N. Y., A CORPORATION OF NEW YORK

MEANS FOR INDICATING METACENTRIC HEIGHT

Application filed December 16, 1929, Serial No. 414,398. Renewed August 11, 1931.

This invention relates to the measurement of the metacentric height of ships or similar bodies. In my application S. N. 338,426, filed February 8, 1929, I have disclosed a method and apparatus whereby metacentric height may be determined by combining the maximum velocity of a rolling movement of a ship or similar body with the corresponding maximum angle or amplitude of said roll. The object of the present invention is the provision of novel apparatus of simplified construction for combining maximum velocity of roll with maximum angle of roll so as to indicate metacentric height.

Figure 1:
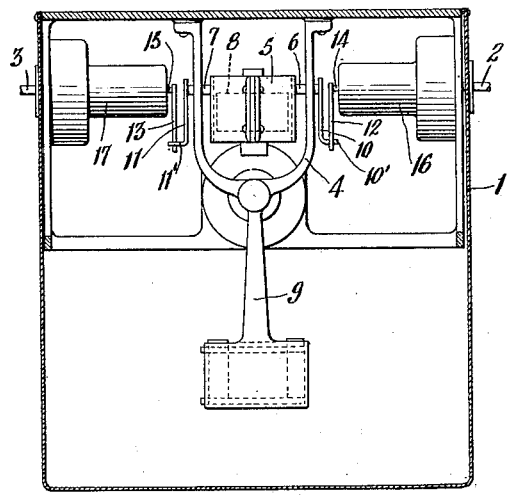
Fig. 1 is a front sectional elevation of an embodiment of the invention looking in a fore and aft or longitudinal direction with respect to the vessel on which it might be placed.
Figure 2:
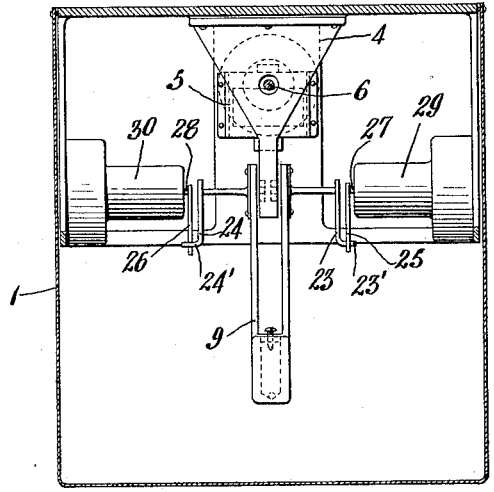
Fig. 2 is a side sectional view of the same embodiment shown in Fig. 1.

Referring to the drawings there is shown at 1 a frame having trunnions 2, 3, whereby said frame may be pivotally supported in brackets or other suitable supports on a ship. Mounted within said frame and secured thereto is a pedestal yoke 4. A gyroscope casing 5 is pivotally suspended in said yoke by trunnions 6, 7. The rotor 8 of said gyroscope is mounted within the casing 5 for rotation about a vertical axis, and the center of gravity of said rotor is located below the axis of the trunnions 6, 7, so that the gyroscope is suspended pendulously. Also, pivotally supported by the yoke 4 is a pendulum 9, which may be internally damped. Preferably, said pendulum, as well as the gyroscope casing 5, is supported by yoke 4 through the medium of ball bearings, as will be readily understood.

It is intended that the frame 1 be so mounted that the axis of the trunnions 2, 3, extends transversely of the vessel, or athwartship, so that neither said frame nor the mechanism contained therein will be affected by trim, pitching, or other fore and aft motion of the vessel. Since the trunnions 6, 7, of the gyroscope casing 5 are in line with the trunnions 2, 3, said casing 5 is also mounted for rotation about an athwartship axis; and turning of said casing, or in other words, precession of the gyroscope about said axis, will occur whenever any transverse rolling of the ship occurs. The extent of precession of the gyroscope against the resistance due to its pendulous mounting is proportional to the velocity of rolling of the vessel. The pivotal axis about which the pendulum 9 is free to turn extends longitudinally of the ship so that the positions assumed by the pendulum with respect to the ship correspond to the angle of roll.

It will thus be seen that in any rolling movement of the ship the position of the gyroscope about the axis of trunnions 6, 7, corresponds to the velocity of roll while the position assumed by the pendulum is a measure of the angle of roll. As has been pointed out in my pending application hereinbefore referred to, the metacentric height is proportional to the ratio between the maximum velocity of any rolling movement of the ship and the maximum angle of roll which the ship has traversed in said movement. For automatically combining the maximum velocity of roll as measured by the gyroscope with the maximum angle of roll as measured by the pendulum, to indicate the metacentric height of the vessel, I provide means constructed substantially as follows:

Fastened to and depending from the trunnions 6, 7, of the gyroscope casing are arms 10, 11, respectively, which arms have outwardly extending fingers 10', 11' adapted to contact with arms 12, 13, depending from and secured to the ends of shafts 14, 15 in the respective casings 16, 17. The casings 16, 17 are mounted in the frame 1, and each of said casings includes a rotor 18 of iron or other suitable magnetic material having a winding 19 and rotatable within a coil 20. The latter forms a primary winding through which alternating current is passed by the wires 21, 22, as shown. The electromotive force induced in the rotor winding 19 varies with the angular position of the rotor. The rotors 18 in the respective casings 16, 17 are secured to the corresponding shafts 14, 15.

It will be noted that the fingers 10', 11' extend respectively behind and in front of the corresponding arms 12, 13, so that said arms are operated in opposite directions by the gyroscope. The positions to which said arms are operated will correspond respectively to the extreme positions of oscillation of the gyroscope on opposite sides of its vertical or neutral position. It will thus be seen that the maximum amplitude of oscillation of the gyroscope will be shown by the relative amount of angular displacement of each of the arms 12, 13 from neutral or vertical position, and that said angular displacement may be used to indicate the value of the maximum velocity of roll or heel of the vessel.

The pendulum 9 has secured thereto a pair of arms 23, 24, provided with fingers 23', 24', respectively, for operating arms 25, 26, secured to rotor shafts 27, 28, respectively, mounted in casings 29, 30 in the frame 1. Each of said casings, like the casings 16, 17, has mounted therein a primary winding through which alternating current is passed, and a rotor secured to the corresponding shaft 27 or 28 and carrying a winding in which an electromotive force is induced by said alternating current, the value of said electromotive force varying with the angular position of the rotor. Through the fingers 23', 24', the respective arms 25, 26 are turned in opposite directions to positions on opposite sides of the vertical and corresponding to the maximum angle of relative swing between the ship and the pendulum. In other words, the positions of the arms 25, 26 correspond proportionately to the maximum angle of rolling or heeling movement of the ship.

In lieu of a plurality of rotor arms, a single one of said arms may be employed in conjunction with the pendulum 9, whereby the maximum amplitude of roll on one side only of neutral position may be obtained; though it may be noted that through the use of two of said arms, as shown, the angular displacement thereof affords an indication of the mean or average maximum angle of roll. Likewise, if desired, a single rotor arm may be employed in conjunction with the gyro casing, though by employing two of said arms as aforesaid an indication is afforded of the mean or average maximum velocity of roll.

Figure 3:
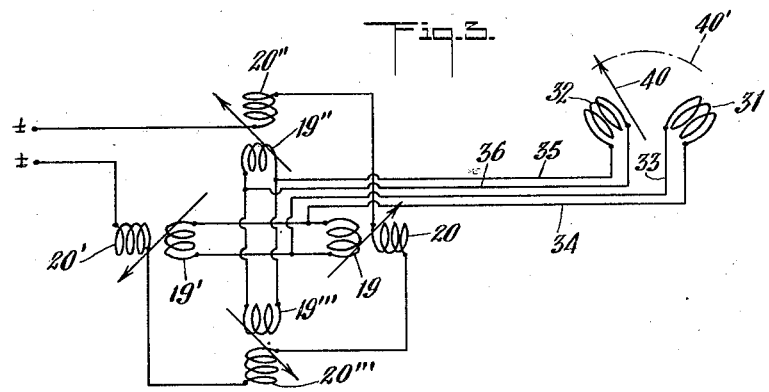
Fig. 3 is a diagrammatic illustration of the electrical wiring and connections of the instrument and electrical indicating device.
Figure 4:
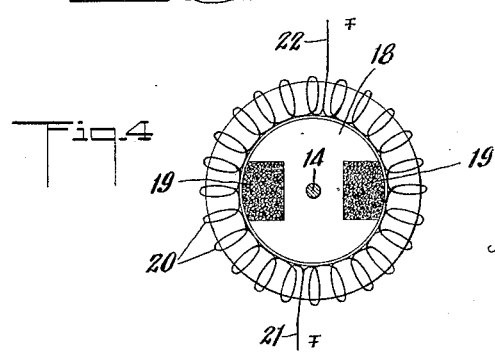
Fig. 4 is a view of a detail.

The electromotive forces induced in the rotor windings in casings 16 and 17 are impressed upon a coil 31 of an indicating instrument which includes a pointer 40, while the electromotive forces induced in the rotor windings in casings 29 and 30 are impressed upon a coil 32 of said instrument. The indicating instrument here shown operates upon the principle of the well-known frequency meter, the position of the pointer 40 being controlled by the relative voltages impressed upon the coils 31, 32 so that each position of said pointer corresponds to the ratio between said voltages. In Fig. 3, the rotor windings controlled by the gyroscope are designated 19, 19', and the corresponding primary windings as 20, 20' respectively; while the rotor windings operated by pendulum 9 are designated 19'', 19''', and the corresponding primary windings as 20'', 20'''. As shown, the primary windings are connected to a source of alternating current. Rotor windings 19, 19' are electrically connected together, and, through wires 33, 34 to coil 31; while rotor windings 19'', 19''' are connected electrically together, and, through wires 35, 36, with coil 32.

It will thus be seen that since the position of the pointer 40 corresponds to the ratio of the voltages impressed upon the respective coils 31, 32, said pointer will indicate the ratio between the maximum travel of the gyroscope (or in other words maximum velocity of roll) and the maximum relative travel between the pendulum and the ship (or in other words maximum angle of roll), because of the above described conditions of movement of the rotor windings. Consequently, by suitably calibrating the scale 40' over which pointer 40 is movable, the metacentric height of the vessel (which is proportional to said ratio of maximum velocity of roll to maximum angle of roll) will be shown directly by said pointer.

In accordance with the provision of the patent statutes, I have herein described the principle of my invention together with the best mode in which I have contemplated applying such principle, but I desire to have it understood that the apparatus shown is only illustrative and that the kind of apparatus and mode of operation employed may be considerably varied without departing from the spirit of my invention. For example, while I have illustrated a particular arrangement of inductively related windings 19, 20, and means for varying the inductive relation therebetween, it will be evident that the arrangement of windings as well as of the inductance varying means may take any of a wide variety of forms without departing from the spirit of my invention.

What I claim is:—

1. In an apparatus of the character described, a winding, means for inducing an electromotive force therein, means for varying the electromotive force induced in said winding in accordance with the angular velocity of rolling movement of a body, a second winding, means for inducing an electromotive force in said second winding, means for varying the electromotive force induced in said second winding in accordance with the angle of rolls, and indicating means controlled by said windings jointly to indicate the metacentric height of the body.

2. In an apparatus of the character described, a primary winding, a secondary winding shiftable with respect to said primary winding, means for automatically shifting said secondary winding to a position corresponding to the maximum angular velocity of a rolling movement of a body, a secondary primary winding, a secondary winding shiftable with relation thereto, means for automatically shifting the last mentioned secondary winding to a position commensurate with the maximum angle of said rolling movement of said body, and means controlled jointly by said windings for indicating the metacentric height of said body.

3. In an apparatus of the character described, a gyroscope responsive to the angular velocity of rolling movement of a body, an element settable by precession of said gyroscope for measuring the maximum velocity of roll of the body on one side of its neutral position, a pendulum, an element settable by said pendulum for measuring the maximum angle of roll on one side of the neutral position of said body, a shiftable winding controlled by the first mentioned element, means for inducing an electromotive force in said winding, a shiftable winding controlled by the second mentioned element, means for inducing an electromotive force in said second winding, and means controlled by said windings jointly for indicating the metacentric height of said body.

4. In an apparatus of the character described, a plurality of primary windings connected to a source of alternating current supply, a secondary winding shiftable with respect to one of said primary windings, means responsive to the angular velocity of rolling movement of a body for setting said secondary winding into a position commensurate with the maximum velocity of roll, a secondary winding shiftable with respect to another of said primary windings, means responsive to the rolling movement of said body for setting said last mentioned secondary winding into a position commensurate with the maximum angle of roll, and means jointly controlled by said windings for indicating the metacentric height of said body.

5. A method of measuring metacentric height which comprises varying voltages induced by an alternating current in accordance with maximum velocity of roll and maximum angle of roll.

6. In an apparatus of the character described, inductance varying means responsive to the angular velocity of roll of a body, inductance varying means responsive to the angle of roll, and means jointly controlled by said two first mentioned means for indicating the metacentric height of said body.

7. In an apparatus of the character described, a shiftable inductance winding, a second shiftable inductance winding, a gyroscope responsive to angular velocity of rolling movement of a body, connections from said gyroscope for operating the first mentioned inductance winding, a pendulum responsive to rolling movement of said body, connections from said pendulum for operating the second mentioned inductance winding, and means connected to said windings for indicating the metacentric height of said body.

In testimony whereof, I have signed my name to this specification this 14th day of December, 1929.

JOHN LYELL WILSON.